(12) United States Patent
Northrop (10) Patent No.: US 10,569,219 B2
(45) Date of Patent: Feb. 25, 2020

(54) SYSTEMS AND METHODS FOR SEPARATING HYDROGEN SULFIDE FROM CARBON DIOXIDE IN A HIGH-PRESSURE MIXED STREAM

(71) Applicant: P. Scott Northrop, Spring, TX (US)

(72) Inventor: P. Scott Northrop, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 415 days.

(21) Appl. No.: 15/219,882

(22) Filed: Jul. 26, 2016

(65) Prior Publication Data

US 2017/0080385 A1     Mar. 23, 2017

Related U.S. Application Data

(60) Provisional application No. 62/221,272, filed on Sep. 21, 2015.

(51) Int. Cl.

| | | |
|---|---|---|
| *B01D 53/52* | (2006.01) | |
| *B01D 53/86* | (2006.01) | |
| *C09K 8/594* | (2006.01) | |
| *E21B 43/40* | (2006.01) | |
| *B01D 53/14* | (2006.01) | |

(Continued)

(52) U.S. Cl.
CPC ......... *B01D 53/52* (2013.01); *B01D 53/1418* (2013.01); *B01D 53/8612* (2013.01); *C01B 17/0404* (2013.01); *C01B 17/48* (2013.01); *C09K 8/594* (2013.01); *E21B 43/40* (2013.01); *B01D 2251/102* (2013.01); *B01D 2251/602* (2013.01); *B01D 2255/10* (2013.01); *B01D 2255/20707* (2013.01); *B01D 2256/22* (2013.01); *B01D 2257/304* (2013.01)

(58) Field of Classification Search
CPC ....................................................... B01D 53/48
See application file for complete search history.

(56) References Cited

U.S. PATENT DOCUMENTS

| | | | |
|---|---|---|---|
| 4,382,912 A | 5/1983 | Madgavkar et al. | 423/224 |
| 4,583,372 A | 4/1986 | Egan et al. | 62/53 |
| 8,312,738 B2 | 11/2012 | Singh et al. | 62/629 |

(Continued)

*Primary Examiner* — William D Hutton, Jr.
*Assistant Examiner* — Avi T Skaist
(74) *Attorney, Agent, or Firm* — ExxonMobil Upstream Research Company—Law Department (57) ABSTRACT

Systems and methods for separating hydrogen sulfide from carbon dioxide in a high-pressure mixed stream are disclosed herein. The methods include receiving the high-pressure mixed stream in an oxidation reactor and at an inlet pressure of at least 0.3 megapascals. The high-pressure mixed stream includes 0.01 to 5 mole percent hydrogen sulfide and at least 90 mole percent carbon dioxide. The methods further include oxidizing the high-pressure mixed stream with an oxidant to generate a high-pressure oxidized stream, includes oxidized hydrogen sulfide and carbon dioxide, at an oxidation pressure of at least 0.3 megapascals. The methods also include separating the high-pressure oxidized stream into an oxidized hydrogen sulfide product and a carbon dioxide product and generating the carbon dioxide product at a pressure of at least 0.3 megapascals. The systems include the high-pressure mixed stream, an oxidation reactor, and a separation assembly.

23 Claims, 2 Drawing Sheets

(51) Int. Cl.
*C01B 17/04* (2006.01)
*C01B 17/48* (2006.01)

(56) References Cited

U.S. PATENT DOCUMENTS

| | | | |
|---|---|---|---|
| 2002/0036086 A1 | 3/2002 | Minkkinen et al. | 166/266 |
| 2012/0079852 A1 | 4/2012 | Northrop et al. | 62/620 |
| 2012/0204599 A1 | 8/2012 | Northrop et al. | 62/617 |
| 2013/0071308 A1 | 3/2013 | Graville | 423/224 |
| 2014/0174747 A1* | 6/2014 | Kelly | E21B 43/267 |
| | | | 166/308.2 |
| 2015/0291421 A1 | 10/2015 | Northrop et al. | 423/574 |

* cited by examiner

SYSTEMS AND METHODS FOR SEPARATING HYDROGEN SULFIDE FROM CARBON DIOXIDE IN A HIGH-PRESSURE MIXED STREAM

CROSS REFERENCE TO RELATED APPLICATIONS

This application claims the priority benefit of U.S. Patent Application No. 62/221,272 filed Sep. 21, 2015 entitled SYSTEMS AND METHODS FOR SEPARATING HYDROGEN SULFIDE FROM CARBON DIOXIDE IN A HIGH-PRESSURE MIXED STREAM, the entirety of which is incorporated by reference herein.

FIELD OF THE DISCLOSURE

The present disclosure relates generally to systems and methods for separating hydrogen sulfide from carbon dioxide in a high-pressure mixed stream and, more particularly, to systems and methods that utilize oxidation of the hydrogen sulfide to facilitate separation of hydrogen sulfide from the carbon dioxide.

BACKGROUND OF THE DISCLOSURE

High-pressure mixed streams that include both hydrogen sulfide and carbon dioxide may be generated as a result of a variety of different industrial processes. As an example, certain hydrocarbon wells may produce a product hydrocarbon stream that includes hydrocarbons, hydrogen sulfide, and carbon dioxide. Such a product hydrocarbon stream also may be referred to herein as a sour gas stream. It may be desirable, or even necessary, to separate the hydrocarbons from the hydrogen sulfide and the carbon dioxide before economic or efficient use of the product hydrocarbon stream may occur. Such a separation process may generate a purified hydrocarbon stream, which includes a lower concentration of hydrogen sulfide and/or a lower concentration of carbon dioxide when compared to the raw hydrocarbon stream, and a byproduct stream, which includes a higher concentration of hydrogen sulfide and/or a high concentration of carbon dioxide when compared to the product hydrocarbon stream.

The byproduct stream may be generated at an elevated pressure and may be referred to herein as a high-pressure mixed stream. Under certain circumstances, it may be desirable to separate the hydrogen sulfide in the high-pressure mixed stream from the carbon dioxide in the high-pressure mixed stream. As an example, the carbon dioxide may be injected into a subterranean formation; however, it may be undesirable to inject the hydrogen sulfide into the subterranean formation.

Traditionally, such separation of hydrogen sulfide from carbon dioxide has been performed at relatively lower pressures, which generally requires that the carbon dioxide be pressurized, such as via a compressor, prior to being injected into the subterranean formation. Such pressurization of the carbon dioxide may be expensive and/or energy-intensive. Thus, there exists a need for improved systems and methods for separating hydrogen sulfide from carbon dioxide in a high-pressure mixed stream.

SUMMARY OF THE DISCLOSURE

Systems and methods for separating hydrogen sulfide from carbon dioxide in a high-pressure mixed stream are disclosed herein. The methods include receiving the high-pressure mixed stream in an oxidation reactor and at an inlet pressure of at least 0.3 megapascals. The high-pressure mixed stream includes 0.01 to 5 mole percent hydrogen sulfide and at least 90 mole percent carbon dioxide. The methods further include oxidizing the high-pressure mixed stream with an oxidant to generate a high-pressure oxidized stream, which includes carbon dioxide and oxidized hydrogen sulfide, at an oxidation pressure of at least 0.3 megapascals. The methods also include separating the high-pressure oxidized stream into an oxidized hydrogen sulfide product and a carbon dioxide product. The oxidized hydrogen sulfide product may be elemental sulfur or sulfur dioxide. The separating includes separating at a separation pressure of at least 0.3 megapascals and generating the carbon dioxide product at a carbon dioxide product pressure of at least 0.3 megapascals. The carbon dioxide product may be injected into a subterranean formation, such as for sequestration or enhanced oil recovery purposes.

The systems include a high-pressure mixed stream. The high-pressure mixed stream includes 0.01 to 5 mole percent hydrogen sulfide, at least 90 mole percent carbon dioxide, and has at least a threshold pressure of 0.3 megapascals. The systems also include an oxidation reactor that is configured to receive the high-pressure mixed stream and to oxidize the high-pressure mixed stream, with an oxidant, to generate a high-pressure oxidized stream. The high-pressure oxidized stream includes carbon dioxide and oxidized hydrogen sulfide and has at least the threshold pressure. The systems further include a separation assembly that is configured to separate the high-pressure oxidized stream into an oxidized hydrogen sulfide product and a carbon dioxide product. The carbon dioxide product has at least the threshold pressure.

DETAILED DESCRIPTION AND BEST MODE OF THE DISCLOSURE

Figure 1:
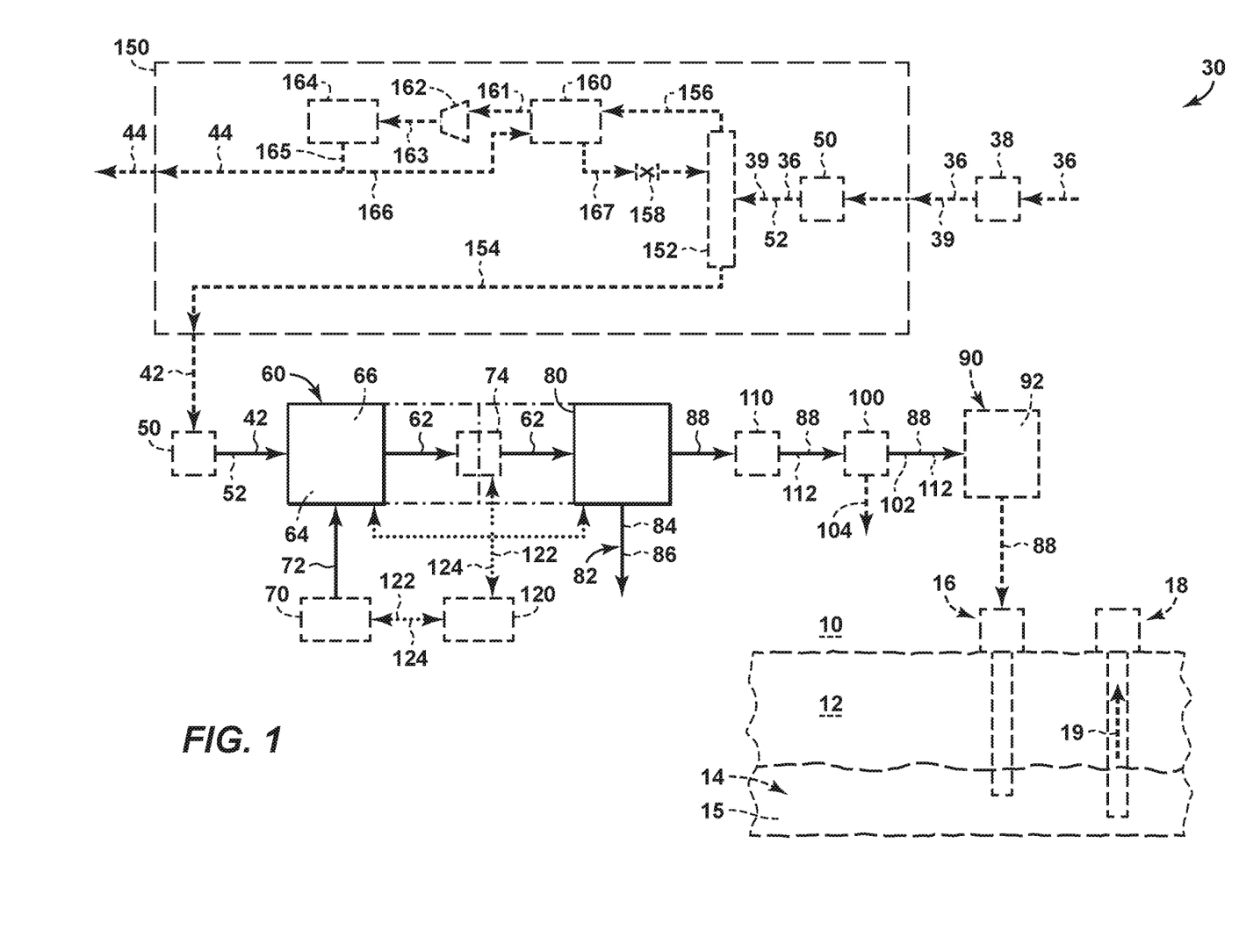
FIG. 1 is a schematic view of systems, according to the present disclosure, for separating hydrogen sulfide from carbon dioxide.
Figure 2:
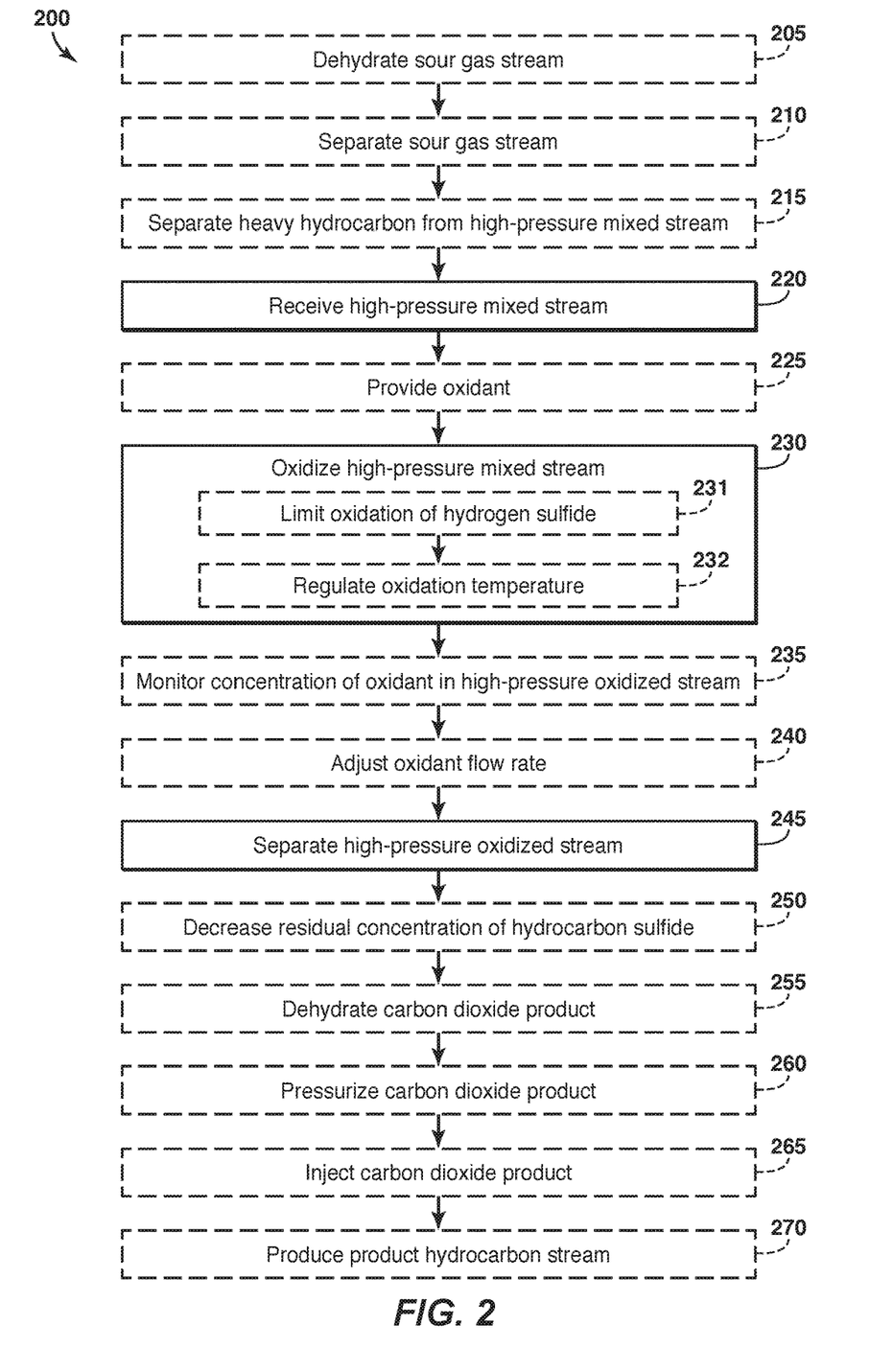
FIG. 2 is a flowchart depicting methods, according to the present disclosure, for separating hydrogen sulfide from carbon dioxide.

FIGS. 1-2 provide examples of systems 30 and methods 200, according to the present disclosure, for separating hydrogen sulfide from carbon dioxide in a high-pressure mixed stream. Elements, components, and/or features that are discussed herein with reference to one or more of FIGS. 1-2 may be included in and/or utilized with either of FIGS. 1-2 without departing from the scope of the present disclosure.

In general, elements that are likely to be included are illustrated in solid lines, while elements that are optional are illustrated in dashed lines. However, elements that are shown in solid lines may not be essential. Thus, an element shown in solid lines may be omitted without departing from the scope of the present disclosure.

FIG. 1 is a schematic view of a system 30, according to the present disclosure, for separating hydrogen sulfide from carbon dioxide in a high-pressure mixed stream 42. The high-pressure mixed stream includes hydrogen sulfide and carbon dioxide and has at least a threshold pressure. System 30 includes an oxidation reactor 60 and a high-pressure mixed stream 42, which may be produced in and/or received by the system. Oxidation reactor 60 is configured to receive high-pressure mixed stream 42 and to oxidize the high-pressure mixed stream with an oxidant to produce and/or generate a high-pressure oxidized stream 62. High-pressure oxidized stream 62 includes carbon dioxide and oxidized hydrogen sulfide and has at least the threshold pressure. System 30 further includes a separation assembly 80 that is configured to separate high-pressure oxidized stream 62 into an oxidized hydrogen sulfide product 82 and a carbon dioxide product 88, at the threshold pressure, such that the carbon dioxide product has at least the threshold pressure.

High-pressure mixed stream 42 may be obtained from and/or supplied by any suitable upstream process, structure, and/or source. As an example, and as illustrated in dashed lines in FIG. 1, a sour gas stream 36 may be provided to a sour gas dehydration assembly 38 to produce and/or generate a dehydrated sour gas stream 39. Sour gas stream 36 may be produced from and/or generated by a hydrocarbon well and may include methane, hydrogen sulfide, and carbon dioxide. Dehydrated sour gas stream 39, when present, may include and/or comprise a lower concentration of water and/or water vapor when compared to sour gas stream 36. Examples of sour gas dehydration assembly 38 include any suitable drier, mechanical drier, chemical drier, dehydrator, mechanical dehydrator, chemical dehydrator, cooling assembly, and/or chiller.

Sour gas stream 36 or dehydrated sour gas stream 39 then may be provided to a sour gas treatment assembly 150. Sour gas treatment assembly 150 may be configured to receive sour gas stream 36 and to separate the sour gas stream into a methane stream 44, which includes a lower concentration of hydrogen sulfide and/or a lower concentration of carbon dioxide than the sour gas stream, and high-pressure mixed stream 42, which includes a higher concentration of hydrogen sulfide and/or a higher concentration of carbon dioxide than the sour gas stream.

Sour gas treatment assembly 150 may include and/or be any suitable structure that may be configured to separate sour gas stream 36 into at least methane stream 44 and high-pressure mixed stream 42. As examples, sour gas treatment assembly 150 may include and/or be an acid gas removal assembly, a distillation or fractionation assembly, and/or a Controlled Freeze Zone™ (CFZ) assembly. Examples of a CFZ assembly are disclosed in U.S. Pat. Nos. 4,583,372 and 8,312,738, the complete disclosure of which are hereby incorporated by reference.

Sour gas treatment assembly 150 may include the CFZ assembly, and as illustrated in FIG. 1, the CFZ assembly may include a plurality of components. As an example, the CFZ assembly may, but is not required to, include a heavy hydrocarbon removal assembly 50. The heavy hydrocarbon removal assembly may be configured to receive sour gas stream 36 or dehydrated sour gas stream 39 and to remove one or more heavy hydrocarbons therefrom to generate a reduced heavy hydrocarbon sour gas stream 52. Examples of heavy hydrocarbon removal assembly 50 include any suitable cooling assembly, which may condense the heavy hydrocarbon, any suitable reactor, which may react the heavy hydrocarbon, any suitable absorption assembly, which may absorb the heavy hydrocarbon with an absorbent, and/or any suitable adsorption assembly, which may adsorb the heavy hydrocarbon with an adsorbent.

Reduced heavy hydrocarbon sour gas stream 52, sour gas stream 36, or dehydrated sour gas stream 39 then may be provided to a CFZ tower 152. CFZ tower 152 may be configured to separate reduced heavy hydrocarbon sour gas stream 52, sour gas stream 36, or dehydrated sour gas stream 39 into a bottoms stream 154 and an overhead stream 156. Bottoms stream 154 may be provided to oxidation reactor 60 as high-pressure mixed stream 42. Additionally or alternatively, bottoms stream 154, or another suitable stream that comprises hydrogen sulfide and carbon dioxide, may be provided to a heavy hydrocarbon removal assembly 50, which may reduce a concentration of heavy hydrocarbons therein and/or may generate a reduced heavy hydrocarbon sour gas stream 52, which may be provided to oxidation reactor 60.

Overhead stream 156 may be provided to a heat exchanger 160, which is configured to cool the overhead stream and to generate a warmed overhead stream 161. Warmed overhead stream 161 may be provided to a compressor 162, which compresses the warmed overhead stream to generate a compressed overhead stream 163. Compressed overhead stream 163 may be provided to a cooler 164, which is configured to cool the compressed overhead stream and to generate a cooled and compressed overhead stream 165. Cooled and compressed overhead stream 165 may be divided into methane stream 44, which may be a product stream that flows from sour gas treatment assembly 150, and a reflux stream 166. Reflux stream 166 may be provided to heat exchanger 160 and may be cooled, via thermal energy exchange with overhead stream 156, to generate a cooled reflux stream 167. Cooled reflux stream 167 may be provided to a Joule-Thomson (J-T) valve 158, and the J-T valve may be utilized to flash the cooled reflux stream into CFZ tower 152. A turbo-expansion device may be used in place of the J-T valve.

Under certain conditions, it may be undesirable for unreacted oxidant to be present within high-pressure oxidized stream 62. As an example, and as discussed in more detail herein, at least a portion of high-pressure oxidized stream 62 may be injected into a subterranean formation, and the presence of oxidant within the portion of the high-pressure oxidized stream that is injected into the subterranean formation may represent a reaction hazard. Under these conditions, oxidation reactor 60 may be configured such that substantially all of the oxidant reacts with the high-pressure mixed stream and/or such that a residual concentration of hydrogen sulfide purposefully may be present within high-pressure oxidized stream 62.

As an example, oxidation reactor 60 may react, or may be configured to react, hydrogen sulfide that is present within high-pressure mixed stream 42 with less than a stoichiometric amount of the oxidant (i.e., an amount of oxidant needed to completely oxidize the hydrogen sulfide to elemental sulfur or to sulfur dioxide). As more specific examples, the oxidation reactor may react the hydrogen sulfide with less than 99 percent, less than 98 percent, less than 97 percent, less than 96 percent, or less than 95 percent of the stoichiometric amount of oxidant.

As another example, oxidation reactor 60 may be staged, such as into a plurality of discrete and/or spaced-apart catalyst beds. Under these conditions, a portion of the stoichiometric amount of oxidant may be provided to, or may be present within, each of the plurality of discrete catalyst beds.

As yet another example, and as discussed in more detail herein, system 30 may be configured to selectively control and/or regulate an amount of oxidant that is present within oxidation reactor 60, that is provided to oxidation reactor 60, and/or that reacts with the hydrogen sulfide. This may include selectively controlling a delivery rate of oxidant to the oxidation reactor based, at least in part, on a flow rate of hydrogen sulfide to the oxidation reactor within high-pressure mixed stream 42, selectively controlling the delivery rate of oxidant to the oxidation reactor based, at least in part, on a flow rate of hydrogen sulfide from the oxidation reactor within high-pressure oxidized stream 62, and/or selectively controlling the delivery rate of the oxidant to the oxidation reactor based, at least in part, on a flow rate of oxidant from the oxidation reactor within the high-pressure oxidized stream.

As illustrated in dashed lines in FIG. 1, carbon dioxide product 88, which also may be referred to herein as a carbon dioxide product stream 88, may be provided to a carbon dioxide purification assembly 110. Carbon dioxide purification assembly 110 also may be referred to herein as a carbon dioxide polishing assembly 110 and may be configured to decrease a residual concentration of hydrogen sulfide within carbon dioxide product 88 to less than a threshold residual hydrogen sulfide concentration and/or to generate a purified carbon dioxide stream 112. Examples of the threshold residual hydrogen sulfide concentration include concentrations of less than 1 mole percent, less than 0.5 mole percent, less than 0.1 mole percent, less than 0.05 mole percent, less than 0.01 mole percent, less than 0.005 mole percent, or less than 0.001 mole percent. Examples of carbon dioxide purification assembly 110 include any suitable structure that may be configured to absorb the residual hydrogen sulfide with an absorbent, to adsorb the residual hydrogen sulfide with an adsorbent, to strip the residual hydrogen sulfide from the carbon dioxide product, and/or to scavenge, or react, the residual hydrogen sulfide to remove the residual hydrogen sulfide from the carbon dioxide product.

Carbon dioxide product 88, or purified carbon dioxide stream 112, additionally or alternatively may be provided to a carbon dioxide dehydration assembly 100. Carbon dioxide dehydration assembly 100 may be configured to dehydrate the carbon dioxide product, such as through removal of water and/or water vapor therefrom, to generate a dry carbon dioxide stream 102 and a water stream 104.

Carbon dioxide product 88, purified carbon dioxide stream 112, or dry carbon dioxide stream 102 then may be provided to an injection assembly 90. Injection assembly 90 may be configured to inject carbon dioxide product 88, or a portion thereof, into an injection well 16. Injection well 16 may extend from a surface region 10, within a subsurface region 12, and/or within a subterranean formation 14 that extends within the subsurface region.

In some embodiments, injection assembly 90 and/or injection well 16 may be configured to sequester carbon dioxide product 88 within subterranean formation 14. In these embodiments, subterranean formation 14 may define a volume that may be selected and/or configured to contain and/or to retain the carbon dioxide product.

In some embodiments, injection assembly 90 and/or injection well 16 may be configured to utilize carbon dioxide product 88 as part of an enhanced oil recovery process. As an example, and as illustrated in dashed lines in FIG. 1, subterranean formation 14 may include viscous hydrocarbons 15, and carbon dioxide product 88 may decrease a viscosity of the viscous hydrocarbons, thereby permitting production of the viscous hydrocarbons, via a production well 18, as a product hydrocarbon stream 19. As another example, injection of carbon dioxide product 88 into subterranean formation 14 may provide a motive force, pressure, or pressure differential that may cause product hydrocarbon stream 19 to flow from subterranean formation 14 via production well 18.

As discussed herein, carbon dioxide product 88 may be discharged from separation assembly 80 with at least the threshold pressure, examples of which are disclosed herein. In certain circumstances, or for some subterranean formations, the threshold pressure may be insufficient to inject the carbon dioxide product into the subterranean formation and/or may be insufficient to facilitate production of product hydrocarbon stream 19. With this in mind, injection assembly 90 may include a pressurization assembly 92. Pressurization assembly 92 may be configured to pressurize carbon dioxide product 88 to an injection pressure, which is greater than the threshold pressure, prior to injection of the carbon dioxide product into the subterranean formation. Examples of the injection pressure include pressures of at least 2 megapascals, at least 3 megapascals, at least 3.5 megapascals, at least 4 megapascals, at least 4.5 megapascals, at least 5 megapascals, at least 5.5 megapascals, at least 6 megapascals, at least 6.5 megapascals, at least 7 megapascals, at least 7.5 megapascals, at least 8 megapascals, at least 9 megapascals, at least 10 megapascals, at least 11 megapascals, at least 12 megapascals, at least 13 megapascals, at least 13.8 megapascals, or at least 14 megapascals.

Carbon dioxide product 88 may include, or be, a liquid and/or supercritical carbon dioxide product 88. Under these conditions, pressurization assembly 92 may include a pump or another structure that is configured to pressurize a liquid stream or a supercritical stream, and it is within the scope of the present disclosure that pressurization assembly 92 may not include, or be, a compressor or another structure that is configured to pressurize a gaseous stream. Additionally or alternatively, carbon dioxide product 88 also may include a gaseous carbon dioxide product 88. Under these conditions, pressurization assembly 92 may include a compressor or other structure that is configured to pressurize a gas stream.

As further illustrated in dashed lines in FIG. 1, system 30 may include an oxidant supply assembly 70. Oxidant supply assembly 70 may be configured to provide an oxidant 72, which also may be referred to herein as an oxidant stream 72, to oxidation reactor 60. As discussed, oxidation reactor 60 may be configured to oxidize high-pressure mixed stream 42 with, via, and/or utilizing oxidant 72 to produce and/or generate high-pressure oxidized stream 62.

Oxidant 72 may include and/or be any suitable oxidant that may be selected to oxidize high-pressure mixed stream 42 and/or hydrogen sulfide that is present within the high-pressure mixed stream. As examples, oxidant 72 may include and/or be a solid-phase oxidant, a liquid-phase oxidant, a hydrogen peroxide solution, a hypochlorite solution, a nitrite solution, a gas-phase oxidant, air, oxygen gas, and/or at least substantially pure oxygen gas.

It is within the scope of the present disclosure that oxidant 72 additionally or alternatively may include any suitable chemical and/or compound that may react with hydrogen sulfide in the high-pressure mixed stream 42, such as to convert hydrogen sulfide in the high-pressure mixed stream into a less reactive and/or benign product. Thus, oxidant 72 also may be and/or be referred to herein as a reactant 72 and/or as a hydrogen sulfide scavenger 72, and the oxidizing referred to herein additionally or alternatively may be referred to as reacting. Under these conditions, the oxidized hydrogen sulfide also may be referred to herein as reacted hydrogen sulfide, and oxidized hydrogen sulfide product 82 also may be referred to herein as reacted hydrogen sulfide product 82. Examples of reactants 72 and/or hydrogen sulfide scavengers 72, which may react with hydrogen sulfide in the high-pressure mixed stream but may not increase an oxidation state of the hydrogen sulfide, include triazine and/or solid iron oxide.

When the oxidant is the gas-phase oxidant, a composition of the gas-phase oxidant may be selected based, at least in part, on a desired composition of high-pressure oxidized stream 62, a desired composition of oxidized hydrogen sulfide product 82, and/or a desired composition of carbon dioxide product 88. As an example, and when it is permissible for nitrogen gas to be present within high-pressure oxidized stream 62 and/or within carbon dioxide product 88, air may be utilized as the oxidant. As another example, and when a low, or no, nitrogen gas content is desired within high-pressure oxidized stream 62 and/or within carbon dioxide product 88, oxygen gas, or substantially pure oxygen gas, may be utilized as the oxidant.

As also illustrated in dashed lines in FIG. 1, system 30 and/or oxidant supply assembly 70 further may include a monitoring assembly 74. Monitoring assembly 74 may be configured to monitor a concentration of oxidant 72 within high-pressure oxidized stream 62. As illustrated in dash-dot lines in FIG. 1, monitoring assembly 74 may extend partially, or even completely, within oxidation reactor 60. Additionally or alternatively, and as also illustrated in dash-dot lines in FIG. 1, monitoring assembly 74 may extend partially, or even completely, within separation assembly 80. Additionally or alternatively, monitoring assembly 74 may be spaced-apart from oxidation reactor 60 and/or from separation assembly 80.

System 30, oxidant supply assembly 70, and/or monitoring assembly 74 further may include and/or may be in communication with a controller 120, and controller 120 may be configured to control and/or regulate the concentration of oxidant 72 within high-pressure oxidized stream 62. This control and/or regulation may be based, at least in part, on the concentration of oxidant 72, or residual oxidant 72, which is measured, determined, and/or monitored by monitoring assembly 74.

The monitoring and/or control of the concentration of oxidant within high-pressure oxidized stream 62 may be accomplished in any suitable manner. As an example, controller 120 may be programmed to provide one or more control signals 122 to oxidant supply assembly 70 and/or to monitoring assembly 74. As another example, controller 120 may be programmed to receive one or more status signals 124 from oxidant supply assembly 70 and/or from monitoring assembly 74.

As a more specific example, controller 120 may be programmed to increase a flow rate of oxidant 72 to oxidation reactor 60 responsive to the concentration of the oxidant in the high-pressure oxidized stream being less than a threshold minimum oxidant concentration. This may include receiving status signal 124, which is indicative of the concentration of the oxidant in the high-pressure oxidized stream, from monitoring assembly 74 and/or providing control signal 122 to oxidant supply assembly 70 to regulate, specify, or decrease the flow rate of the oxidant to the oxidation reactor, with the control signal being based, at least in part, on the status signal. Examples of the threshold minimum oxidant concentration include oxidant concentrations of less than 0.1 mole percent, less than 0.05 mole percent, less than 0.01 mole percent, less than 0.005 mole percent, or less than 0.001 mole percent.

As another more specific example, controller 120 may be programmed to decrease the flow rate of oxidant 72 to oxidation reactor 60 responsive to the concentration of the oxidation in the high-pressure oxidized stream being greater than a threshold maximum oxidant concentration. This may include receiving status signal 124, which is indicative of the concentration of the oxidant in the high-pressure oxidized stream, from monitoring assembly 74 and/or providing control signal 122 to oxidant supply assembly 70 to regulate, specify, or decrease the flow rate of the oxidant to the oxidation reactor, with the control signal being based, at least in part, on the status signal. Examples of the threshold maximum oxidant concentration include oxidant concentrations of greater than 0.01 mole percent, greater than 0.05 mole percent, greater than 0.1 mole percent, greater than 0.5 mole percent, or greater than 1 mole percent.

As yet another example, controller 120 may be programmed to stage the oxidant into the plurality of discrete catalyst beds. As another example, controller 120 may be programmed to provide less than the stoichiometric amount of oxidant to the oxidation reactor.

High-pressure mixed stream 42 may include any suitable stream that includes hydrogen sulfide and carbon dioxide and has at least the threshold pressure. In general, high-pressure mixed stream 42 will include at least a threshold minimum fraction of hydrogen sulfide and/or will include less than a threshold maximum fraction of hydrogen sulfide. Examples of the threshold minimum fraction of hydrogen sulfide include fractions of at least 0.0001 mole percent, at least 0.0005 mole percent, at least 0.001 mole percent, at least 0.005 mole percent, at least 0.01 mole percent, at least 0.05 mole percent, at least 0.1 mole percent, at least 0.5 mole percent, or at least 1 mole percent. Examples of the threshold maximum fraction of hydrogen sulfide include fractions of less than 10 mole percent, less than 9 mole percent, less than 8 mole percent, less than 7 mole percent, less than 6 mole percent, less than 5 mole percent, less than 4 mole percent, less than 3 mole percent, less than 2 mole percent, or less than 1 mole percent.

Similarly, high-pressure mixed stream 42 generally will include at least a threshold minimum fraction of carbon dioxide. Examples of the threshold minimum fraction of carbon dioxide include fractions of at least 70 mole percent, at least 75 mole percent, at least 80 mole percent, at least 85 mole percent, at least 90 mole percent, or at least 95 mole percent.

Examples of the threshold pressure include pressures of at least 0.1 megapascals, at least 0.2 megapascals, at least 0.3 megapascals, at least 0.345 megapascals, at least 0.4 megapascals, at least 0.5 megapascals, at least 0.75 megapascals, at least 1 megapascal, at least 1.5 megapascals, at least 2 megapascals, at least 2.07 megapascals, at least 2.5 megapascals, at least 3 megapascals, at least 4 megapascals, or at least 5 megapascals. Additionally or alternatively, the threshold pressure may be less than 10 megapascals, less than 9 megapascals, less than 8 megapascals, less than 7 megapascals, less than 6 megapascals, less than 5 megapascals, less than 4.14 megapascals, less than 4 megapascals, less than 3 megapascals, or less than 2 megapascals.

Depending upon the temperature, pressure, and/or composition thereof, high-pressure mixed stream 42 may be provided to oxidation reactor 60 in any suitable state. As examples, high-pressure mixed stream 42 may include and/or be a gaseous high-pressure mixed stream 42, a liquid high-pressure mixed stream 42, and/or a supercritical high-pressure mixed stream 42 and may include a single phase or more than one phase.

Oxidation reactor 60 may include and/or be any suitable structure that may be configured to receive high-pressure mixed stream 42 and to oxidize the high-pressure mixed stream to generate high-pressure oxidized stream 62. As an example, oxidation reactor 60 may include a solid catalyst bed 64, which may be configured to catalyze oxidation of high-pressure mixed stream 42. Examples of the solid catalyst bed include a titanium dioxide catalyst bed and a noble metal catalyst bed.

As illustrated in dashed lines in FIG. 1, oxidation reactor 60 may include a temperature control assembly 66. Temperature control assembly 66 may be in communication with controller 120 and/or may be configured to control and/or regulate a temperature within oxidation reactor 60, such as to permit direct oxidation of the hydrogen sulfide to elemental sulfur and/or to limit oxidation of the hydrogen sulfide to sulfur dioxide.

As examples, temperature control assembly 66 may be configured to increase the temperature within oxidation reactor 60 responsive to the temperature within the oxidation reactor being less than a lower threshold oxidation temperature and/or to decrease the temperature within the oxidation reactor responsive to the temperature within the oxidation reactor being greater than an upper threshold oxidation temperature. As additional examples, the temperature control assembly may be configured to increase the temperature within the oxidation reactor responsive to a concentration of sulfur dioxide within high-pressure oxidized stream 62 being less than a threshold lower fraction of an initial hydrogen sulfide concentration within high-pressure mixed stream 42 and/or to decrease the temperature within the oxidation reactor responsive to the concentration of sulfur dioxide within high-pressure oxidized stream 62 being greater than a threshold upper fraction of the initial hydrogen sulfide concentration.

Examples of the threshold lower fraction include less than 3 percent, less than 2 percent, less than 1 percent, less than 0.5 percent, or less than 0.1 percent of the initial hydrogen sulfide concentration. Examples of the threshold upper fraction include greater than 2 percent, greater than 3 percent, greater than 4 percent, greater than 5 percent, greater than 6 percent, greater than 7 percent, greater than 8 percent, greater than 9 percent, or greater than 10 percent of the initial hydrogen sulfide concentration.

In general, oxidation of high-pressure mixed stream 42 within oxidation reactor 60 may be an exothermic process. Under these conditions, temperature control assembly 66 may include and/or be a cooling assembly that may be configured to decrease the temperature of the oxidation reactor and/or to maintain the temperature of the oxidation reactor below a threshold maximum temperature.

It is within the scope of the present disclosure that oxidation reactor 60 may include and/or utilize any suitable reaction, reaction chemistry, and/or process to oxidize high-pressure mixed stream 42 and/or to generate high-pressure oxidized stream 62 from the high-pressure mixed stream and the oxidant. As an example, the oxidation reactor may utilize direct oxidation of hydrogen sulfide to elemental sulfur according to equation 1.

$$H_2S + 1/2 O_2 \rightarrow H_2O + S \tag{1}$$

Such a direct oxidation process may generate water, which may exit separation assembly 80 with carbon dioxide product 88, and elemental sulfur 84, which may exit separation assembly 80 as oxidized hydrogen sulfide product 82. Carbon dioxide dehydration assembly 100 may be utilized to remove the water from the carbon dioxide product.

If additional oxygen is supplied to oxidation reactor 60, at least a portion of the hydrogen sulfide may be oxidized to sulfur dioxide according to equation 2.

$$H_2S + 3/2 O_2 \rightarrow H_2O + SO_2 \tag{2}$$

In some embodiments, sulfur dioxide may be the desired final product. In these embodiments, sulfur dioxide 86 may exit separation assembly 80 as oxidized hydrogen sulfide product 82.

However, in other embodiments, it may be desirable to restrict, limit, or minimize oxidation of hydrogen sulfide to sulfur dioxide within oxidation reactor 60 and/or it may be desirable to maximize, optimize, or preferentially oxidize hydrogen sulfide to elemental sulfur. In these embodiments, oxidation reactor 60, oxidant supply assembly 70, and/or controller 120 may be utilized to control, limit, and/or regulate introduction of oxygen into the oxidation reactor.

As an example, and as discussed herein, oxidant supply assembly 70 may control and/or regulate the flow of oxidant 72 to oxidation reactor 60 based, at least in part, on the concentration of sulfur dioxide within high-pressure oxidized stream 62, which may be measured and/or determined by monitoring assembly 74. As another example, oxidation reactor 60 may be configured to limit, or stage, introduction of oxidant 72 and/or contact between oxidant 72 and high-pressure mixed stream 42. As yet another example, temperature control assembly 66 may be utilized to regulate the temperature within oxidation reactor 60. As yet another example, solid catalyst bed 64 may be the noble metal catalyst bed.

Another example of a reaction, reaction chemistry, and/or process that may be utilized to oxidize high-pressure mixed stream 42 and/or to generate high-pressure oxidized stream 62 from the high-pressure mixed stream and the oxidant is a Mobil Direct Oxidation Process™ (MODOP). In the MODOP process, a controlled amount of oxidant, such as air or substantially pure oxygen gas, is injected into the high-pressure mixed stream to generate a combined stream that then is reacted over solid catalyst bed 64 in the form of a titanium dioxide catalyst bed. The temperature of the reaction is regulated to be within a specified temperature range, such as via temperature control assembly 66. To control over-oxidation to sulfur dioxide, oxidation reactor 60 may be separated into a series of spaced-apart catalyst beds and/or the oxidant injection may be staged into the plurality of spaced-apart catalyst beds.

Yet another example of a reaction, reaction chemistry, and/or process that may be utilized to oxidize high-pressure mixed stream 42 and/or to generate high-pressure oxidized stream 62 from the high-pressure mixed stream and the oxidant is the Claus reaction. The Claus reaction utilizes sulfur dioxide as the oxidant and generally proceeds according to equation 3.

$$2H_2S + SO_2 \rightarrow 2H_2O + 3S \tag{3}$$

Additionally or alternatively, a modified version of the Claus reaction, which generally is referred to as a MCRC process, may be utilized. The MCRC process is operated at temperatures that are below the dew point of elemental sulfur and is catalyzed by an alumina catalyst. The elemental sulfur produced by the MCRC process condenses in the pores of the alumina catalyst, and the condensed sulfur periodically is removed to regenerate the catalyst.

Another example of a reaction, reaction chemistry, and/or process that may be utilized to oxidize high-pressure mixed stream 42 and/or to generate high-pressure oxidized stream 62 from the high-pressure mixed stream and the oxidant is the selective oxidation, or Selectox, process. In the Selectox process, oxidant may be mixed with the high-pressure mixed stream over a proprietary catalyst. The proprietary catalyst catalyzes oxidation of a portion of the hydrogen sulfide that is present within the high-pressure mixed stream into sulfur dioxide (according the equation 2). The sulfur dioxide then reacts with the remainder of the hydrogen sulfide to generate elemental sulfur (according to equation 3).

Yet another example of a reaction, reaction chemistry, and/or process that may be utilized to oxidize high-pressure mixed stream 42 and/or to generate high-pressure oxidized stream 62 from the high-pressure mixed stream and the oxidant is oxidation in a liquid oxidant. Such a liquid oxidant may be utilized, for example, when high-pressure mixed stream 42 includes relatively higher concentrations of hydrogen sulfide, such as concentrations in the range of greater than 0.25 mole percent, greater than 0.5 mole percent, greater than 0.75 mole percent, greater than 1 mole percent, greater than 1.5 mole percent, greater than 2 mole percent, or greater than 2.5 mole percent. Examples of the liquid oxidant include the hydrogen peroxide solution, the hypochlorite solution, and/or the nitrite solution, and in the case of reactants and/or scavengers that remove hydrogen sulfide from the high-pressure mixed stream, may include triazine, a triazine solution, a hydrogen sulfide scavenger, and/or a hydrogen sulfide scavenger solution.

Another example of a reaction, reaction chemistry, and/or process that may be utilized to oxidize high-pressure mixed stream 42 and/or to generate high-pressure oxidized stream 62 from the high-pressure mixed stream and the oxidant is oxidation with a solid oxidant. Such a solid oxidant may be utilized, for example, when high-pressure mixed stream 42 includes relatively lower concentrations of hydrogen sulfide, such as concentrations in the range of less than 2 mole percent, less than 1.5 mole percent, less than 1 mole percent, less than 0.75 mole percent, less than 0.5 mole percent, less than 0.25 mole percent, or less than 0.1 mole percent. An example of the solid oxidant, which also may be referred to as a solid reactant, is iron oxide.

Separation assembly 80 may include any suitable structure and/or may perform any suitable process that may, or may be utilized to, separate high-pressure oxidized stream 62 into oxidized hydrogen sulfide product 82 and carbon dioxide product 88. Oxidized hydrogen sulfide product 82 may include any suitable oxidized form of hydrogen sulfide, such as elemental sulfur 84 and/or sulfur dioxide 86, with the oxidized form of hydrogen sulfide being selected based upon the reaction, reaction chemistry, and/or process that is utilized by oxidation reactor 60. In addition, oxidized hydrogen sulfide product 82 may be discharged from separation assembly 80 as, or in, any suitable state, or phase, including a solid, liquid, supercritical, and/or gaseous phase, and the phase may be based upon the pressure and the temperature of the oxidized hydrogen sulfide product. Similarly, carbon dioxide product 88 may be discharged from separation assembly 80 as, or in, any suitable state, or phase, including a solid, liquid, supercritical, and/or gaseous phase.

The exact structure of separation assembly 80 may be selected based, at least in part, on a chemical composition of high-pressure oxidized stream 62 (e.g., if the hydrogen sulfide is oxidized to elemental sulfur or to sulfur dioxide within the oxidation reactor) and/or on a physical state of high-pressure oxidized stream 62 (e.g., liquid, gaseous, supercritical, and/or multi-phase). Examples of separation assembly 80 include a gravity separation assembly, a filter, a settling assembly, a liquid-phase and density-based separation assembly, a solid-liquid separation assembly, a solid-gas separation assembly, a liquid-liquid separation assembly, an adsorption assembly, a distillation or fractionation assembly, and/or an absorption assembly. As more specific examples, and when oxidized hydrogen sulfide product is discharged from separation assembly 80 as solid-phase elemental sulfur, a gravity separation assembly, a filter, a settling assembly, and/or a solid-liquid separation assembly may be utilized.

Separation assembly 80 may be separate and/or spaced-apart from oxidation reactor 60, as illustrated in solid lines in FIG. 1. Alternatively, separation assembly 80 may be adjacent to, attached to, and/or form a portion of, oxidation reactor 60, as illustrated in dash-dot lines in FIG. 1.

FIG. 2 is a flowchart depicting examples of methods 200, according to the present disclosure, of separating hydrogen sulfide from carbon dioxide in a high-pressure mixed stream. Methods 200 may include dehydrating a sour gas stream at 205, separating the sour gas stream at 210, and/or separating a heavy hydrocarbon from a high-pressure mixed stream at 215. Methods 200 include receiving the high-pressure mixed stream at 220 and may include providing an oxidant at 225. Methods 200 further include oxidizing the high-pressure mixed stream at 230 and may include monitoring a concentration of oxidant in the high-pressure oxidized stream at 235 and/or adjusting an oxidant flow rate at 240. Methods 200 also include separating a high-pressure oxidized stream at 245 and may include decreasing a residual concentration of hydrogen sulfide at 250, dehydrating a carbon dioxide product at 255, pressurizing the carbon dioxide product at 260, injecting the carbon dioxide product at 265 and/or producing a product hydrocarbon stream at 270.

Dehydrating the sour gas stream at 205 may include removing water, gaseous water, and/or water vapor from the sour gas stream and may be performed prior to the separating at 210. Separating the sour gas stream at 210 may include separating any suitable sour gas stream, which may include methane, carbon dioxide, and hydrogen sulfide, into a methane stream, which includes at least a substantial portion of the methane, and the high-pressure mixed stream, which includes at least a substantial portion of the carbon dioxide and the hydrogen sulfide. This may include separating with, via, and/or utilizing a sour gas treatment assembly, examples of which are disclosed herein with reference to sour gas treatment assembly 150 of FIG. 1.

Separating the heavy hydrocarbon from the high-pressure mixed stream at 215 may include decreasing a concentration of heavy hydrocarbon, such as hydrocarbons with greater than 2, 3, 4, 5, or 6 carbon atoms, in the high-pressure mixed stream and may be accomplished in any suitable manner. As an example, the separating at 215 may include cooling the high-pressure mixed stream to condense the heavy hydrocarbon, reacting the heavy hydrocarbon, absorbing the heavy hydrocarbon on an absorbent, and/or adsorbing the heavy hydrocarbon within an adsorbent. The separating at 215 may be performed utilizing any suitable structure, such as heavy hydrocarbon removal assembly 50, which is discussed in detail herein with reference to FIG. 1. Typically, the separating at 215 is performed prior to the receiving at 220.

Receiving the high-pressure mixed stream at 220 may include receiving the high-pressure mixed stream in an oxidation reactor, such as oxidation reactor 60 of FIG. 1. As discussed herein, the high-pressure mixed stream has at least a threshold minimum fraction of hydrogen sulfide and/or may have less than a threshold maximum fraction of hydrogen sulfide when received within the oxidation reactor. Examples of the threshold minimum fraction of hydrogen sulfide and of the threshold maximum fraction of hydrogen sulfide are disclosed herein. The receiving at 220 further may include receiving the high-pressure mixed stream at an inlet pressure that is at, or above, a threshold pressure. Examples of the threshold pressure are disclosed herein.

The receiving at 220 may include receiving the high-pressure mixed stream from, as a result of, and/or as part of, any suitable process and/or processes. As examples, the high-pressure mixed stream may be received from and/or may be provided by an acid gas removal process and/or a distillation process. As a more specific example, the high-pressure mixed stream may be received from and/or may be provided by a CFZ process.

It is within the scope of the present disclosure that the receiving at 220 may include receiving the high-pressure mixed stream in any suitable state and/or phase. As examples, the receiving at 220 may include receiving a liquid high-pressure mixed stream, receiving a gaseous high-pressure mixed stream, and/or receiving a supercritical high-pressure mixed stream.

Providing the oxidant at 225 may include providing the oxidant to the oxidation reactor. This may include providing the oxidant utilizing, or via, any suitable oxidant supply assembly, such as oxidant supply assembly 70 of FIG. 1.

Oxidizing the high-pressure mixed stream at 230 may include oxidizing the high-pressure mixed stream within the oxidation reactor and/or with the oxidant to generate the high-pressure oxidized stream. The high-pressure oxidized stream includes oxidized hydrogen sulfide and carbon dioxide, and the oxidizing at 230 includes oxidizing at an oxidation pressure that is at, or above, the threshold pressure. Examples of oxidized hydrogen sulfide include elemental sulfur and sulfur dioxide and are discussed in more detail herein.

The oxidizing at 230 may be accomplished in any suitable manner and/or utilizing any suitable reaction, reaction chemistry, and/or process, such as those that are discussed herein with reference to oxidation reactor 60 of FIG. 1. As an example, the oxidizing at 230 may include oxidizing within an oxidation catalyst bed. As another example, the oxidizing at 230 may include oxidizing with less than a stoichiometric amount of oxidant, such as to limit a concentration of the oxidant in the high-pressure oxidized stream, such that the high-pressure oxidized stream includes at least a threshold amount of hydrogen sulfide, and/or such that the high-pressure oxidized stream includes less than a threshold amount of the oxidant. Examples of the threshold amount of hydrogen sulfide include at least 0.001 mole percent, at least 0.005 mole percent, at least 0.01 mole percent, at least 0.05 mole percent, or at least 0.1 mole percent. Examples of the threshold amount of the oxidant include less than 1 mole percent, less than 0.5 mole percent, less than 0.1 mole percent, less than 0.05 mole percent, less than 0.01 mole percent, less than 0.005 mole percent, or less than 0.001 mole percent.

As a more specific example, the oxidizing at 230 may include oxidizing via, or utilizing, a catalytic direct oxidation process. Under these conditions, the oxidant may include, or be, pure, or at least substantially pure, oxygen gas, and/or the oxidizing at 230 may be catalyzed by a solid catalyst bed, which may include a titanium dioxide catalyst and/or a noble metal catalyst. As another more specific example, the oxidizing at 230 may include oxidizing via, or utilizing, a solid oxidant, examples of which are disclosed herein. Under these conditions, the high-pressure mixed stream may include a relatively lower concentration of hydrogen sulfide, examples of which are disclosed herein. As yet another more specific example, the oxidizing at 230 may include oxidizing via, or utilizing, a liquid oxidant, examples of which are disclosed herein. Under these conditions, the high-pressure mixed stream may include a relatively higher concentration of hydrogen sulfide, examples of which are disclosed herein.

As discussed, the high-pressure mixed stream may include and/or be a liquid high-pressure mixed stream, a gaseous high-pressure mixed stream, and/or a supercritical high-pressure mixed stream. As such, the oxidizing at 230 may include oxidizing the liquid high-pressure mixed stream, oxidizing the high-pressure mixed stream while maintaining the high-pressure mixed stream in a liquid state, oxidizing the gaseous high-pressure mixed stream, oxidizing the high-pressure mixed stream while maintaining the high-pressure mixed stream in a gaseous state, oxidizing the supercritical high-pressure mixed stream, and/or oxidizing the high-pressure mixed stream while maintaining the high-pressure mixed stream in a supercritical state.

The oxidizing at 230 may be accomplished in any suitable manner. As examples, the oxidizing at 230 may include directly oxidizing hydrogen sulfide to elemental sulfur. Under these conditions, the oxidizing at 230 further may include limiting oxidation of hydrogen sulfide to sulfur dioxide, as indicated at 231. The limiting at 231 may include limiting by controlling and/or regulating a concentration of oxidant within the oxidation reactor.

The oxidizing at 230 also may include regulating an oxidation temperature within the oxidation reactor, such as to permit direct oxidation of the hydrogen sulfide to elemental sulfur and/or to limit oxidation of the hydrogen sulfide to sulfur dioxide. The regulating at 232 may be accomplished in any suitable manner. As an example, the regulating at 232 may include increasing the temperature within the oxidation reactor responsive to the temperature within the oxidation reactor being less than a lower threshold oxidation temperature. As another example, the regulating at 232 may include decreasing the temperature within the oxidation reactor responsive to the temperature within the oxidation reactor being greater than an upper threshold oxidation temperature. As yet another example, the regulating at 232 may include increasing the temperature within the oxidation reactor responsive to a concentration of sulfur dioxide within the high-pressure oxidized stream being less than a threshold lower fraction of an initial hydrogen sulfide concentration within the high-pressure mixed stream. As another example, the regulating at 232 may include decreasing the temperature within the oxidation reactor responsive to the concentration of sulfur dioxide within the high-pressure oxidized stream being greater than a threshold upper fraction of the initial hydrogen sulfide concentration. Examples of the threshold lower fraction of the initial hydrogen sulfide concentration and of the threshold upper fraction of the initial hydrogen sulfide concentration are disclosed herein.

Monitoring the concentration of oxidant in the high-pressure oxidized stream at 235 may include monitoring in any suitable manner. As an example, the monitoring at 235 may include determining and/or detecting the concentration of oxidant in the high-pressure oxidized stream, such as via a monitoring assembly. Examples of the monitoring assembly are disclosed herein with reference to monitoring assembly 74 of FIG. 1.

When methods 200 include the monitoring at 235, methods 200 further may include adjusting, at 240, the flow rate of oxidant to the oxidation reactor based, at least in part, on the monitoring at 235. As an example, the adjusting at 240 may include increasing the flow rate of the oxidant to the oxidation reactor responsive to the concentration of oxidant in the high-pressure oxidized stream being less than a threshold minimum oxidant concentration. As another example, the adjusting at 240 may include decreasing the flow rate of oxidant to the oxidation reactor responsive to the concentration of oxidant in the high-pressure oxidized stream being greater than a threshold maximum oxidant concentration. Examples of the threshold minimum oxidant concentration and/or of the threshold maximum oxidant concentration are disclosed herein.

Separating the high-pressure oxidized stream at 245 may include separating the high-pressure oxidized stream into an oxidized hydrogen sulfide product and the carbon dioxide product. The separating at 245 may be performed subsequent to the oxidizing at 230 and/or may include separating at a separation pressure that is at, or above, the threshold pressure. In addition, the separating at 245 also may include generating the carbon dioxide product at a carbon dioxide product pressure that is at, or above, the threshold pressure.

The separating at 245 may be accomplished in any suitable manner. As an example, the separating at 245 may include separating with, within, and/or utilizing a separation assembly, such as separation assembly 80 of FIG. 1. This may include separating the oxidized hydrogen sulfide from liquid carbon dioxide, separating the oxidized hydrogen sulfide from supercritical carbon dioxide, and/or separating the oxidized hydrogen sulfide from gaseous carbon dioxide.

As a more specific example, and when the oxidized hydrogen sulfide product includes, or consists essentially of, elemental sulfur, the separating at 245 may include separating under the influence of gravity and/or via filtering. As another more specific example, and when the oxidized hydrogen sulfide product includes, or consists essentially of, sulfur dioxide, the separating at 245 may include separating via selective adsorption of the sulfur dioxide or the carbon dioxide onto a solid media, separating via distillation, and/or separating via selective absorption of the sulfur dioxide or the carbon dioxide into a liquid.

Decreasing the residual concentration of hydrogen sulfide at 250 may include decreasing the residual concentration of hydrogen sulfide in, or within, the carbon dioxide product and may be performed subsequent to the separating at 245. The decreasing at 250 may be performed in any suitable manner, such as utilizing carbon dioxide purification assembly 110, which is discussed herein with reference to FIG. 1. In addition, the decreasing at 250 may include decreasing the concentration of hydrogen sulfide to less than a threshold residual hydrogen sulfide concentration, examples of which are disclosed herein.

Dehydrating the carbon dioxide product at 255 may include decreasing a concentration of water, gaseous water, and/or water vapor within the carbon dioxide product and may be performed subsequent to the separating at 245. The dehydrating at 255 may be performed in any suitable manner, such as via, or utilizing, carbon dioxide dehydration assembly 100 of FIG. 1. Additionally or alternatively, the dehydrating at 255 may include separating the carbon dioxide product into a dry carbon dioxide stream and a water stream.

Pressurizing the carbon dioxide product at 260 may include pressurizing subsequent to the separating at 245 and/or prior to the injecting at 265. The pressurizing at 260 may include pressurizing to an injection pressure that is greater than the threshold pressure. Examples of the injection pressure are disclosed herein. As discussed in more detail herein, the carbon dioxide product may include and/or be a liquid carbon dioxide product and/or a supercritical carbon dioxide product. As such, the pressurizing at 260 may include pressurizing with a pump, pressurizing without compressing a gas, and/or compressing without utilizing a compressor. When the carbon dioxide product is the liquid carbon dioxide product, the pressurizing at 260 may include pressurizing the liquid carbon dioxide product. Similarly, when the carbon dioxide product is the supercritical carbon dioxide product, the pressurizing at 260 may include pressurizing the supercritical carbon dioxide product. Additionally or alternatively, the carbon dioxide product also may include, or be, a gaseous carbon dioxide product. As such, the pressurizing at 260 may include pressurizing the gaseous carbon dioxide product and/or pressurizing with the compressor.

Injecting the carbon dioxide product at 265 may include injecting the carbon dioxide product into a subterranean formation, such as via an injection well. Examples of the injection well are disclosed herein with reference to injection well 16 of FIG. 1. The injecting at 265 may be performed in any suitable manner and/or for any suitable purpose. As an example, the injecting at 265 may include injecting to sequester the carbon dioxide product within the subterranean formation. As another example, the injecting at 265 may include injecting as part of an enhanced oil recovery process.

When the injecting at 265 includes injecting as part of the enhanced oil recovery process, the separating at 245 may include separating such that a concentration of hydrogen sulfide within the carbon dioxide product is less than a threshold hydrogen sulfide concentration. Examples of the threshold hydrogen sulfide concentration include concentrations of less than 1 mole percent, less than 0.5 mole percent, less than 0.1 mole percent, less than 0.05 mole percent, less than 0.01 mole percent, less than 0.005 mole percent, or less than 0.001 mole percent.

Producing the product hydrocarbon stream at 270 may include producing the product hydrocarbon stream from the subterranean formation, such as via a production well that extends within the subterranean formation. Examples of the production well are disclosed herein with reference to production well 18 of FIG. 1.

When methods 200 include both the injecting at 265 and the producing at 270, the producing at 270 may be performed subsequent to the injecting at 265 and/or may be performed at least partially responsive to the injecting at 265. As an example, the injecting at 265 may include providing a motive force for the producing at 270. As another example, the injecting at 265 may include decreasing a viscosity of a viscous hydrocarbon that is present within the subterranean formation and that forms at least a portion of the product hydrocarbon stream.

As discussed, the systems and methods disclosed herein maintain the high-pressure mixed stream, the high-pressure oxidized stream, and the carbon dioxide product at, or above, the threshold pressure. Stated another way, the systems and methods disclosed herein may be configured to perform at least the receiving at 220, the oxidizing at 230, and the separating at 245 without compressing the carbon dioxide and/or without mechanically increasing a pressure of the carbon dioxide. As such, the systems and methods disclosed herein may provide improved efficiency when compared to other separation processes that operate at lower pressures, that require compression of gaseous carbon dioxide to separate the high-pressure mixed stream into the oxidized hydrogen sulfide product and the carbon dioxide product, and/or that require compression of gaseous carbon dioxide prior to injection of the carbon dioxide into a subterranean formation.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The systems and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:
1. A method of separating hydrogen sulfide from carbon dioxide in a high-pressure mixed stream, the method comprising:

receiving the high-pressure mixed stream in an oxidation reactor, wherein the high-pressure mixed stream includes 0.01 to 5 mole percent hydrogen sulfide and at least 90 mole percent carbon dioxide, and further wherein the receiving includes receiving the high-pressure mixed stream at an inlet pressure of at least 3 megapascals;

oxidizing the high-pressure mixed stream with an oxidant to generate a high-pressure oxidized stream that includes oxidized hydrogen sulfide and carbon dioxide, wherein the oxidizing includes oxidizing at an oxidation pressure of at least 3 megapascals, wherein the oxidizing includes oxidizing with less than a stoichiometric amount of the oxidant such that at least one of:
(i) the high-pressure oxidized stream includes at least a threshold amount of hydrogen sulfide; and
(ii) the high-pressure oxidized stream includes less than 0.01 mole percent of the oxidant; and subsequent to the oxidizing, separating the high-pressure oxidized stream into an oxidized hydrogen sulfide product and a carbon dioxide product, wherein the separating the high-pressure oxidized stream includes separating at a separation pressure of at least 3 megapascals, and further wherein the separating the high-pressure oxidized stream includes generating the carbon dioxide product at a carbon dioxide product pressure of at least 3 megapascals;

injecting the carbon dioxide product into a subterranean formation.

2. The method of claim 1, wherein the injecting includes injecting as part of an enhanced oil recovery process, and further wherein, subsequent and at least partially responsive to the injecting, the method includes producing a product hydrocarbon stream from the subterranean formation.

3. The method of claim 1, wherein, subsequent to the separating the high-pressure oxidized stream and prior to the injecting, the method further includes pressurizing the carbon dioxide product to an injection pressure of at least 6.5 megapascals.

4. The method of claim 3, wherein at least one of:
(i) the carbon dioxide product is a liquid carbon dioxide product, and further wherein the pressurizing includes pressurizing the liquid carbon dioxide product; and
(ii) the carbon dioxide product is a supercritical carbon dioxide product, and further wherein the pressurizing includes pressurizing the supercritical carbon dioxide product.

5. The method of claim 1, wherein the oxidizing includes oxidizing hydrogen sulfide to at least one of elemental sulfur and sulfur dioxide.

6. The method of claim 5, wherein the oxidizing further includes limiting oxidation of the hydrogen sulfide to sulfur dioxide by regulating a concentration of oxidant within the oxidation reactor.

7. The method of claim 5, wherein the oxidizing further includes regulating an oxidation temperature within the oxidation reactor to limit oxidation of the hydrogen sulfide to sulfur dioxide, wherein the regulating the oxidation temperature includes at least one of:
(i) increasing the temperature within the oxidation reactor responsive to the temperature within the oxidation reactor being less than a lower threshold oxidation temperature;
(ii) decreasing the temperature within the oxidation reactor responsive to the temperature within the oxidation reactor being greater than an upper threshold oxidation temperature;
(iii) increasing the temperature within the oxidation reactor responsive to a concentration of sulfur dioxide within the high-pressure oxidized stream being less than 1 percent of an initial hydrogen sulfide concentration within the high-pressure mixed stream; and
(iv) decreasing the temperature within the oxidation reactor responsive to the concentration of sulfur dioxide within the high-pressure oxidized stream being greater than 5 percent of the initial hydrogen sulfide concentration.

8. The method of claim 1, wherein the oxidizing includes oxidizing within an oxidation catalyst bed.

9. The method of claim 1, wherein the oxidizing includes oxidizing via a catalytic direct oxidation process.

10. The method of claim 9, wherein the oxidant includes oxygen gas.

11. The method of claim 1, wherein the oxidant is a reactant that includes iron oxide, and further wherein the high-pressure mixed stream includes less than 1 mole percent hydrogen sulfide.

12. The method of claim 1, wherein the oxidant includes a liquid oxidant, and further wherein the high-pressure mixed stream includes greater than 1 mole percent hydrogen sulfide.

13. The method of claim 1, wherein, subsequent to the separating the high-pressure oxidized stream, the method further includes decreasing a residual concentration of hydrogen sulfide within the carbon dioxide product to less than 0.01 mole percent.

14. The method of claim 1, wherein the method further includes providing the oxidant to the oxidation reactor.

15. The method of claim 14, wherein the method further includes monitoring a concentration of the oxidant in the high-pressure oxidized stream, and further wherein the method includes at least one of:
(i) increasing a flow rate of the oxidant to the oxidation reactor responsive to the concentration of the oxidant in the high-pressure oxidized stream being less than a threshold minimum oxidant concentration; and
(ii) decreasing the flow rate of the oxidant to the oxidation reactor responsive to the concentration of the oxidant in the high-pressure oxidized stream being greater than a threshold maximum oxidant concentration.

16. The method of claim 1, wherein the method includes performing at least the receiving, the oxidizing, and the separating the high-pressure oxidized stream without at least one of:
(i) compressing the carbon dioxide; and
(ii) mechanically increasing a pressure of the carbon dioxide.

17. A system for separating hydrogen sulfide from carbon dioxide in a high-pressure mixed stream, the system comprising:
the high-pressure mixed stream, which includes 0.01 to 5 mole percent hydrogen sulfide and at least 90 mole percent carbon dioxide and has a threshold pressure of at least 3 megapascals;
an oxidation reactor configured to receive the high-pressure mixed stream and to oxidize the high-pressure mixed stream with an oxidant to generate a high-pressure oxidized stream that includes oxidized hydrogen sulfide and carbon dioxide and has the threshold pressure, wherein the oxidizing includes oxidizing with less than a stoichiometric amount of the oxidant such that at least one of:
(i) the high-pressure oxidized stream includes at least a threshold amount of hydrogen sulfide; and (ii) the high-pressure oxidized stream includes less than 0.01 mole percent of the oxidant; and a separation assembly configured to separate the high-pressure oxidized stream into an oxidized hydrogen sulfide product and a carbon dioxide product, wherein the carbon dioxide product has the threshold pressure, wherein the system further includes injecting the carbon dioxide product into a subterranean formation.

18. The system of claim 17, wherein the system further includes an injection assembly configured to inject the carbon dioxide product into an injection well that extends within a subterranean formation.

19. The system of claim 18, wherein the system further includes a production well configured to produce a product hydrocarbon stream from the subterranean formation.

20. The system of claim 18, wherein the injection assembly includes a pressurization assembly configured to pressurize the carbon dioxide product to an injection pressure of at least 6.5 megapascals prior to injection of the carbon dioxide product into the subterranean formation, and further wherein the pressurization assembly includes a pump.

21. The system of claim 17, wherein the oxidation reactor further includes a temperature control assembly configured to regulate a temperature within the oxidation reactor, and further wherein the temperature control assembly is configured to at least one of:
  (i) increase the temperature within the oxidation reactor responsive to the temperature within the oxidation reactor being less than a lower threshold oxidation temperature;
  (ii) decrease the temperature within the oxidation reactor responsive to the temperature within the oxidation reactor being greater than an upper threshold oxidation temperature;
  (iii) increase the temperature within the oxidation reactor responsive to a concentration of sulfur dioxide within the high-pressure oxidized stream being less than 1 percent of an initial hydrogen sulfide concentration; and
  (iv) decrease the temperature within the oxidation reactor responsive to the concentration of sulfur dioxide within the high-pressure oxidized stream being greater than 5 percent of the initial hydrogen sulfide concentration.

22. The system of claim 17, wherein the system further includes a sour gas treatment assembly configured to receive a sour gas stream and to separate the sour gas stream into a methane stream and the high-pressure mixed stream, wherein the sour gas treatment assembly includes at least one of:
  (i) an acid gas removal assembly; and
  (ii) a distillation assembly.

23. The system of claim 17, wherein the system further includes a monitoring assembly configured to monitor a concentration of the oxidant in the high-pressure oxidized stream, and further wherein the system includes a controller programmed to at least one of:
  (i) increase a flow rate of the oxidant to the oxidant reactor responsive to the concentration of the oxidant in the high-pressure oxidized stream being less than a threshold minimum oxidant concentration; and
  (ii) decrease the flow rate of the oxidant to the oxidation reactor responsive to the concentration of the oxidant in the high-pressure oxidized stream being greater than a threshold maximum oxidant concentration.

* * * * *